US006488233B1

(12) United States Patent
Myrabo

(10) Patent No.: US 6,488,233 B1
(45) Date of Patent: Dec. 3, 2002

(54) LASER PROPELLED VEHICLE

(75) Inventor: Leik N. Myrabo, Bennington, VT (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 09/846,683

(22) Filed: Apr. 30, 2001

(51) Int. Cl.[7] ............................................. B64C 39/00

(52) U.S. Cl. .......................................... 244/62; 244/51

(58) Field of Search ......................... 244/51, 62, 73 R, 244/74, 172

(56) References Cited

U.S. PATENT DOCUMENTS

| | | | | |
|---|---|---|---|---|
| 3,818,700 A | * | 6/1974 | Kantrowitz et al. | 244/172 |
| 3,825,211 A | * | 7/1974 | Minovitch | 244/172 |
| 4,036,012 A | * | 7/1977 | Monsler | 219/121.6 |
| 4,170,330 A | * | 10/1979 | Hertzberg et al. | 244/3.13 |
| 5,078,336 A | * | 1/1992 | Carter | 239/265.19 |
| 5,520,356 A | * | 5/1996 | Ensley | 244/172 |
| 5,647,559 A | * | 7/1997 | Romer et al. | 244/3.13 |

OTHER PUBLICATIONS

Myrabo et al., 1998, "Ground and Flight Tests of a Laser Propelled Vehicle," American Institute of Aeronautics and Astronautics, Inc., 36th Aerospace Sciences Meeting & Exhibit, Jan. 12–15, 1998, Reno NV.*

Dooling, Dave, "Riding the Highways of Light" for the Space Science News homepage of NASA Marshall Space Flight Center.*

* cited by examiner

Primary Examiner—Charles T. Jordan
Assistant Examiner—Gabriel S Sukman
(74) Attorney, Agent, or Firm—Thomas C. Stover

(57) ABSTRACT

Provided is a laser propelled craft having a) a forebody or nose, b) a tapering parabolic afterbody optic or mirror, c) a shroud mounted therebetween and extending aft to define an annular space around a portion of the afterbody near its base and d) means to transmit a pulsed laser beam toward the laser craft and afterbody optic and thence to focus into the annular shroud. The laser beam is pulsed to heat and pressurize the air in the annular space to expand same and propel such craft, the afterbody and shroud being so shaped as to self center or remain in the laser beam as the craft is propelled thereby. Such craft, which is spin-stablized, can also carry a fuel insert ring mounted in the shroud around the afterbody, to be ablated by the laser beam at a desired altitude, so as to transition from an air breathing craft to a rocket craft, when the atmospheric density becomes too low, e.g., at 30 km altitude so that the lasercraft can thereafter be propelled into, e.g., low earth orbit.

17 Claims, 10 Drawing Sheets

LASER PROPELLED VEHICLE

RELATED APPLICATIONS

None

STATEMENT OF GOVERNMENT INTEREST

The invention described herein may be manufactured and used by or for the Government for governmental purposes without the payment of any royalty thereon.

FIELD OF THE INVENTION

This invention relates to laser propelled vehicles, particularly launching such vehicles or craft with a laser beam.

BACKGROUND OF THE INVENTION

The fundamental problem facing our nation's ability to conduct routine space operations is the high cost now associated with conducting launch operations with conventional chemical rockets. Current information shows that it costs between $2,500 and $12,000 a pound to reach low-earth orbit. Chemical rockets typically carry their working fluid and energy source (propellants) on board. This results in a payload fraction (satellite weight/total rocket weight) of only a few percent. Rocket based combined cycle concepts employing momentum exchange with the atmosphere during a portion of the ascent and pure rocket propulsion as it enters space, can reduce costs by perhaps a factor of two and improve the payload fraction slightly. No other near term chemically-fueled launch vehicle prospects are in view that can create a significant reduction in space launch cost and payload.

Laser propelled lightweight vehicles, e.g. 20–60 grams have been tried and flown for short distances. See for example "Ground and Flight tests of a Laser Propelled Vehicle" by L.N. Myrabo et al. Jan. 12–15, 1998, AIAA 98-1001 and a subsequent paper entitled "Flight and Ground Tests of a Laser-Boosted Vehicle" by F. B. Mead, Jr. et al. Jul. 13–15, 1998, AIAA 98-3735, which papers are incorporated herein by reference.

However, such systems have succeeded in vertical laser propulsion of a vehicle for only short vertical distances, e.g., up to 28 meters and there is need and market for a laser propulsion system that surpasses such altitudes.

There has now been discovered a laser propulsion system that can boost such vehicles considerably higher, e.g., up to 100 meters or more, toward suborbital or orbital flights including, launch-to-orbit of satellites and other payloads at greatly reduced costs.

SUMMARY OF THE INVENTION

Broadly the present invention provides a laser propelled vehicle or craft comprising,
a) forebody or nose,
b) a tapering afterbody optic and
c) an annular shroud mounted around and between the extremities of the forebody and the afterbody, which shroud extends aft and defines an annular space around a portion of the afterbody and
d) means to direct a laser beam toward said afterbody and thence to the annular shroud, to heat and pressurize the air in the annular space to an expanding plasma to propel the craft; the afterbody and shroud being so shaped as to self center or remain in the laser beam as the craft is propelled thereby.

The above embodiment is employed in the atmosphere up to an altitude of, e.g., 30 km and is designated herein as the air-breathing embodiment of the invention.

In a second (or hybrid) embodiment of the invention, the lasercraft of the invention can carry a propellant therein so that after launch it can transition from air breathing to rocket mode, as discussed below. The above lasercraft is initially an air breathing laser propulsion system. However air-breathing engines can only be used within the atmosphere and such craft going into space must, in reality, carry some additional propellant on board for operation in the vacuum of space. Being able to operate well, either with just an air based propellant and also with an onboard propellant, is the definition of a "dual-mode" engine. In the case of launching the lasercraft of the invention into orbit, propellant is carried on board for use above, e.g., at an altitude of up to 30 km (18.6 mi or roughly 100,000 ft) and at a velocity of up to Mach 5. Thus for an actual space mission, the lasercraft would carry about half its weight in propellant.

In a third embodiment, the lasercraft of the invention carries a propellant on board, which is heated to ablation at launch and thereafter, by a laser beam to generate thrust and accordingly operates at all times as a rocket engine, through the atmosphere in a suborbital path or into space in an orbital path, as desired.

All three of the above embodiments can fly suborbital paths and in the case of embodiments two and three hereof, fly as well, in orbital flight paths per the invention.

Definitions:

By "air plasma" as used herein, is meant air heated sufficiently high by the inverse Bremsstrahlung Process to provide dissociated and ionized particles, including those of oxygen and nitrogen, which subsequently produce a high pressure burst of thrust between shroud and afterbody, created by laser supported detonation (LSD) and/or combustion(LSC) waves. Between such laser pulses or the propulsion bursts, new air rushes into the annular space to await the next laser pulse.

By "laser craft", as used herein, is included the alternate designation of "laser lightcraft".

BRIEF DESCRIPTION OF THE DRAWINGS

The invention will become more apparent from the following detailed specification and drawings in which.

DESCRIPTION OF PREFERRED EMBODIMENTS

Figure 1:
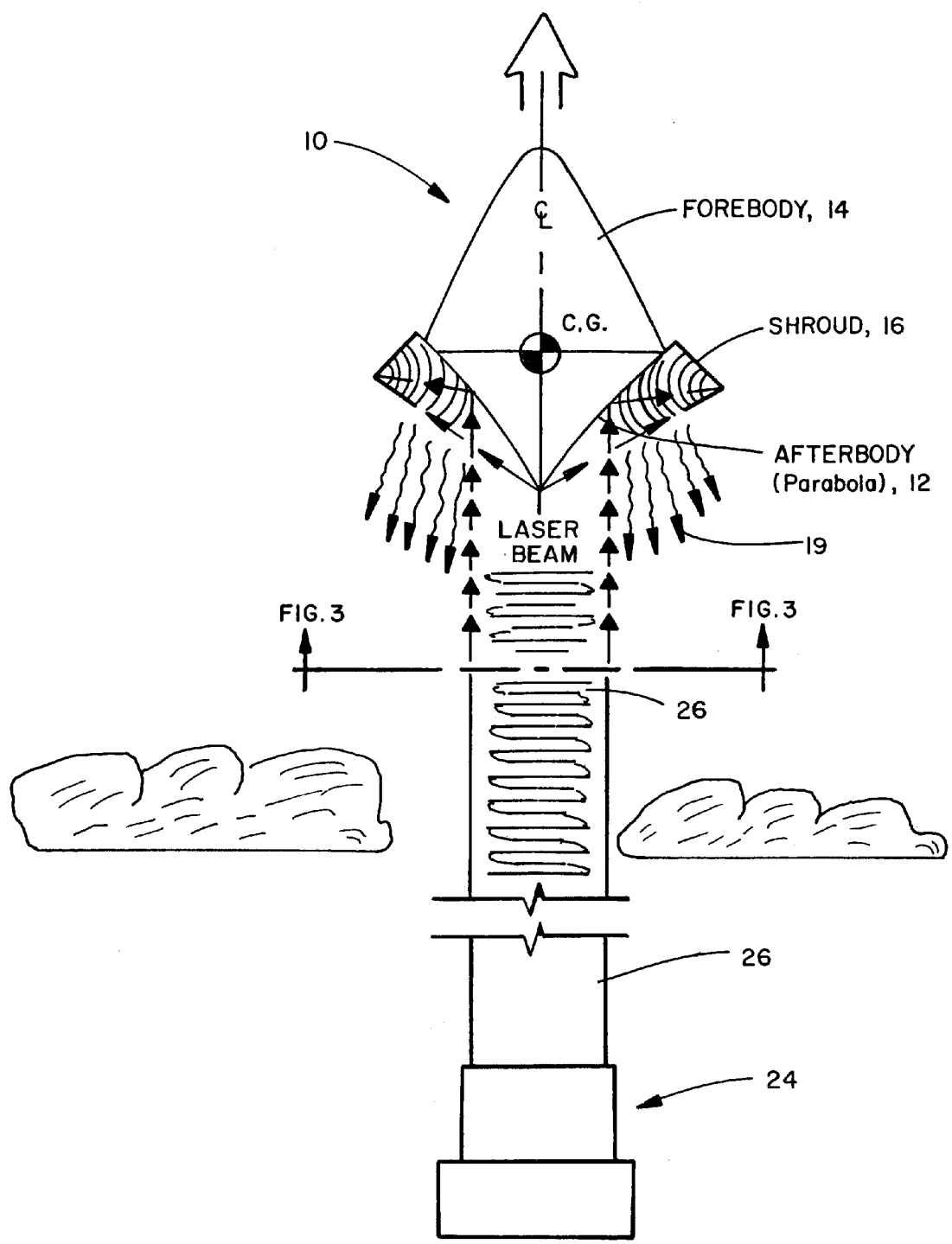
FIG. 1 is an elevation schematic view of a laser propelled vehicle or craft of the present invention.
Figure 4:
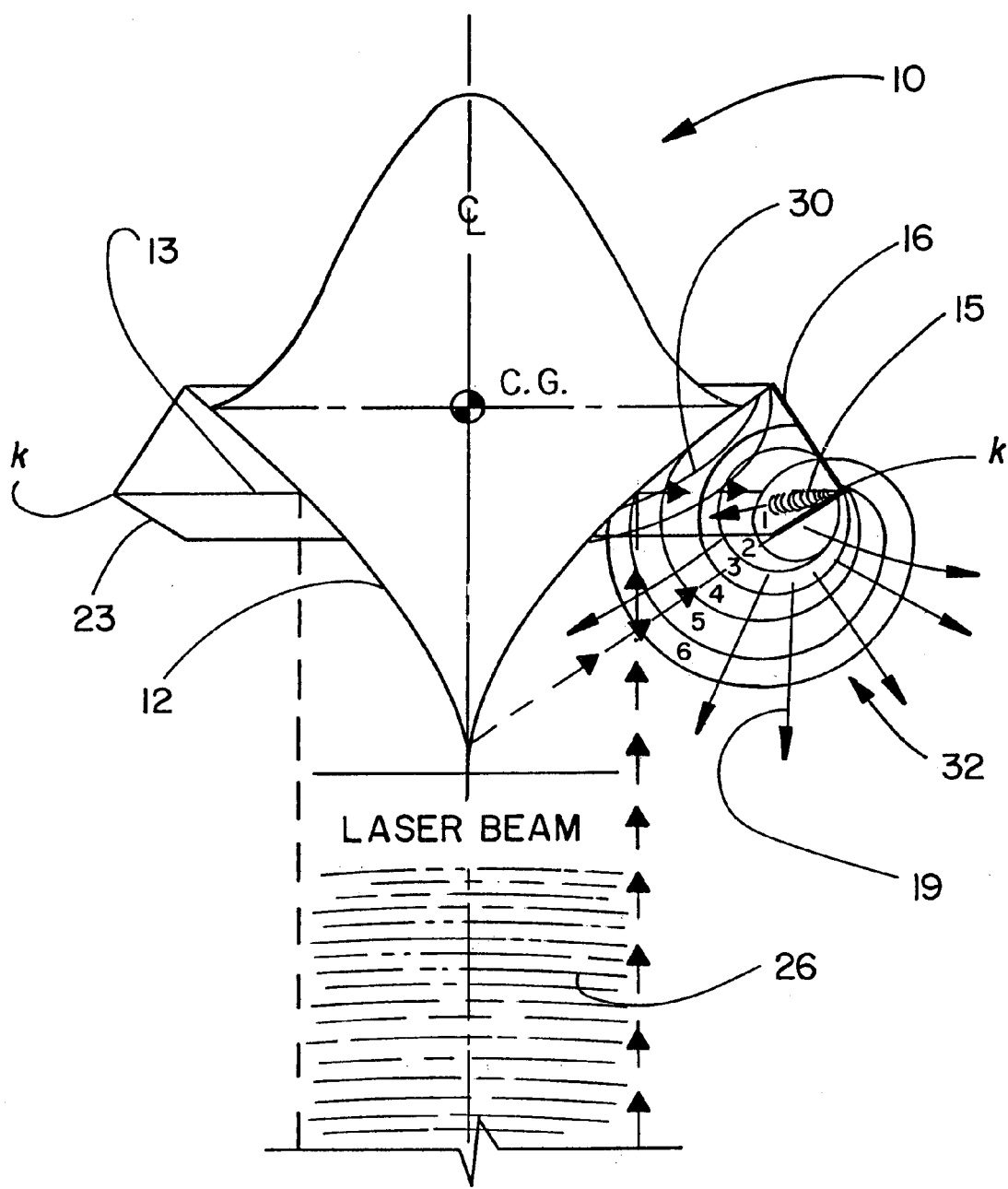
FIG. 4 is an enlarged fragmentary schematic view of part of the lasercraft of FIG. 1, in the air-breathing propulsion mode, flying through the atmosphere.
Figure 10:
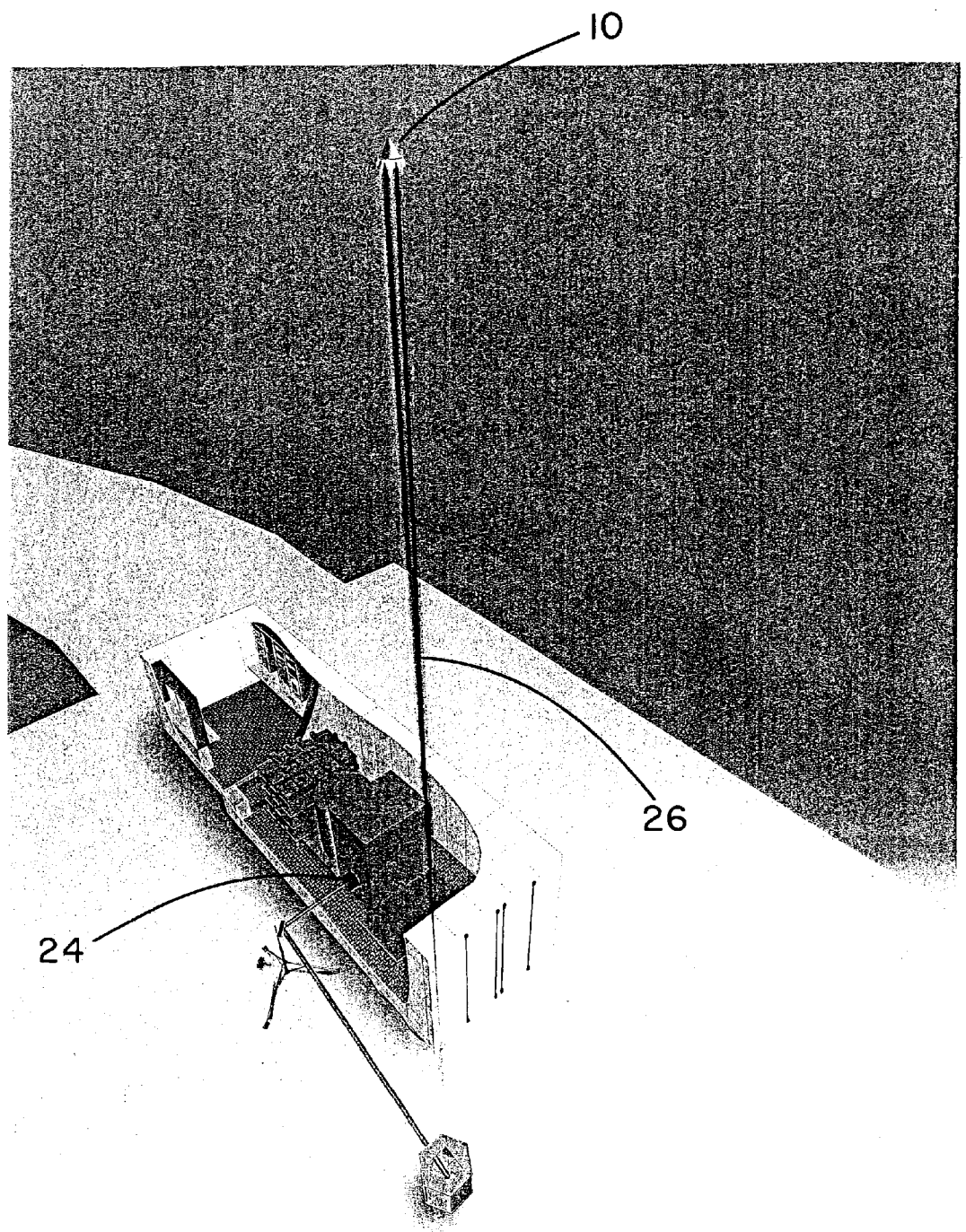
FIG. 10 is a perspective cutaway schematic view of the laser propelled vehicle system of the invention in operation.

As shown in FIGS. 1, 4 and 10, the lasercraft 10 of the invention is an axisymmetric, laser propelled vehicle that in one embodiment does not carry any propellant on board. The lasercraft 10 uses only the air available in the atmosphere for propulsion (up to, e.g., 30 km altitude). The lasercraft 10 includes 3 metal components, e.g. of aluminum including aircraft aluminum, which components define an assembly that is powered by an air-breathing pulse-detonation engine as described below.

These components are, e.g., per FIG. 1:
1) the forebody aeroshell 14,
2) the afterbody 12, which has a dual function as a primary receptive optic (parabolic mirror) for the laser beam and as an external expansion surface (plug nozzle) for the high pressure plasma (discussed below) and
3) the annular shroud 16 which, in combination with the afterbody, is the primary thrust structure.

Figure 2:
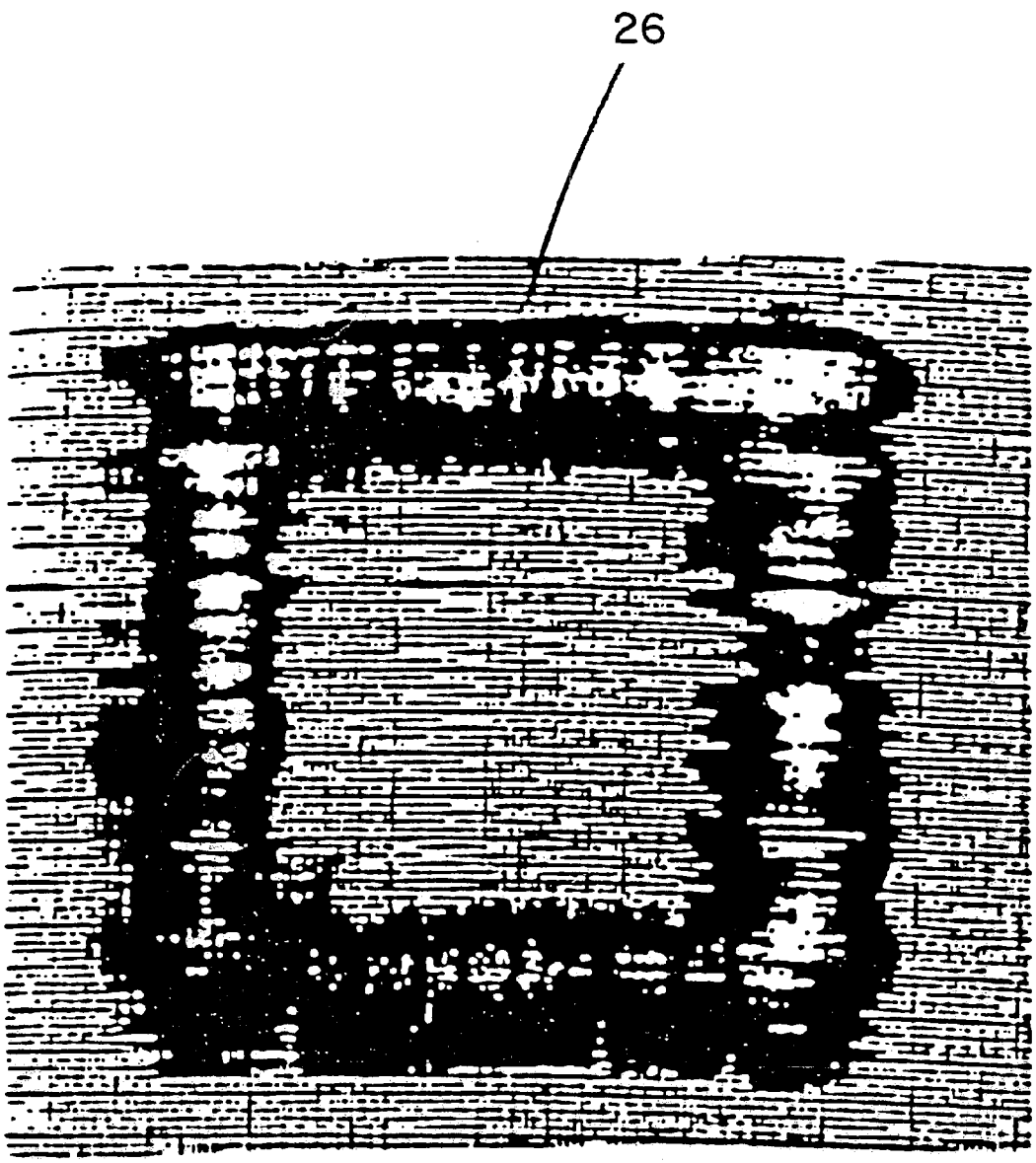
FIG. 2 is a cross-sectional schematic view of a laser beam employed in the launch system embodying the invention.

The lasercraft is preferably powered by a pulsed, electric discharge, kilowatt class $CO_2$ laser beam 26 of annular and preferably circular shape, e.g. per FIG. 2. The Lasercraft 10 is desirably spin stabilized (as discussed below) and has an afterbody and shroud combination, so shaped as to cause such craft to self-center or remain in a laser beam. Such vehicle weighs, e.g., 20 to 60 grams and can fly on a 10 kW average power pulsed $CO_2$ laser (350 J pulses, 28 Hz, & 18-$\mu$s pulse width). An example of such laser powered system is shown in FIG. 10.

In the air-breathing propulsion embodiment of the invention, as shown in FIGS. 1 and 4, laser beam 26 reflects off the afterbody 12 and is focused into the crook k of the shroud 16 in the igniter ring 13, defined by such crook that encircles the afterbody 12, as indicated in FIG. 4.

At such igniter ring, the air is heated by the pulsed laser up to 10,000° C. or more, which causes surface-induced electrical breakdown of the air at the igniter ring 13 and a laser supported detonation (and/or LSC) wave 15 to propagate toward the afterbody 12, causing unpowered blast waves 32 and reflected shock waves 30 to provide a pulsed thrust 19 out the nozzle defined by the afterbody 12 and the shroud 16, that propels the lasercraft 10 upwardly per FIGS. 1 and 4.

The endo-atmospheric lasercraft of the invention is designed to be the air-breathing embodiment of a laser propelled trans-atmospheric vehicle with a mass fraction of, e.g., 0.5.

In a second embodiment, the lasercraft utilizes air-breathing and rocket propulsion modes (dual mode). During launch it transitions from air-breathing to rocket mode at a desired altitude and speed, e.g., at 100 meters and Mach 1 or at, e.g., 30 km and Mach 5.

The laser propulsion engine and satellite hardware can be closely packaged in such vehicle. That is, as shown in FIG. 5, the satellite hardware 18 is mounted near the center of gravity (CG) of the lasercraft 40 and a rocket fuel ring 20 is carried in the crook k of shroud 17.

Figure 5:
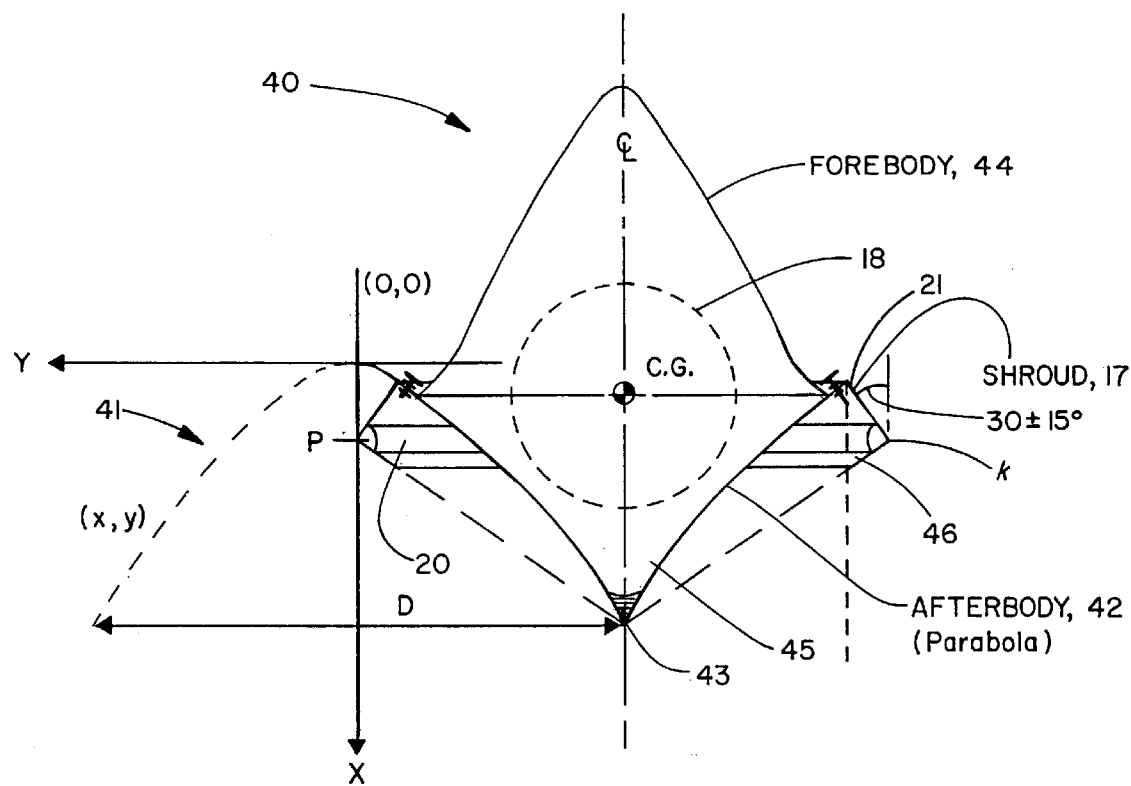
FIG. 5 is an elevation schematic view of a hybrid lasercraft embodying the invention.
Figure 6:
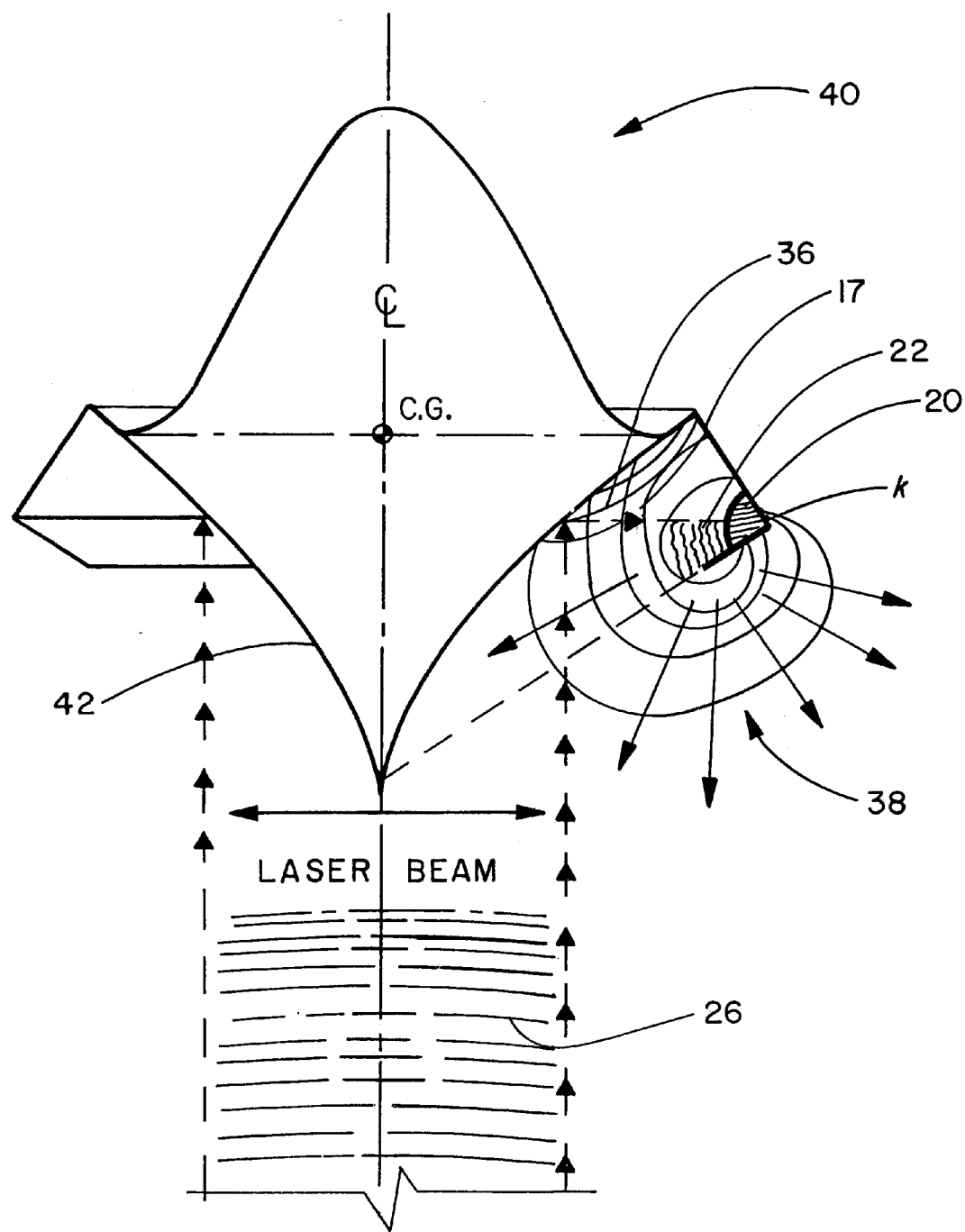
FIG. 6 is a fragmentary schematic view of part of the lasercraft of FIG. 5 in a rocket propelled mode in the atmosphere.

The hybrid lasercraft of FIG. 5 is driven upwardly in the atmosphere in an air breathing or rocket propulsion mode per FIG. 6 and as the air thins, the fuel ring is now ablated and the laser craft becomes rocket propelled. That is, the laser beam 26 is reflected off the afterbody 42 and focused on the fuel ring 20 mounted in the crook k of the shroud 17 per FIG. 6.

The pulsed laser energy is absorbed volumetrically within the propellant i.e., in depth rather than just at the surface thereof. The propellant 20 ablates rapidly during the laser pulse, causing high pressure, high temperature rocket gases 22 to drive an unpowered blast wave 38 out of the nozzle defined by the afterbody 42 and shroud 17, in the manner shown in FIG. 6, as the lasercraft moves through the atmosphere.

Figure 7:
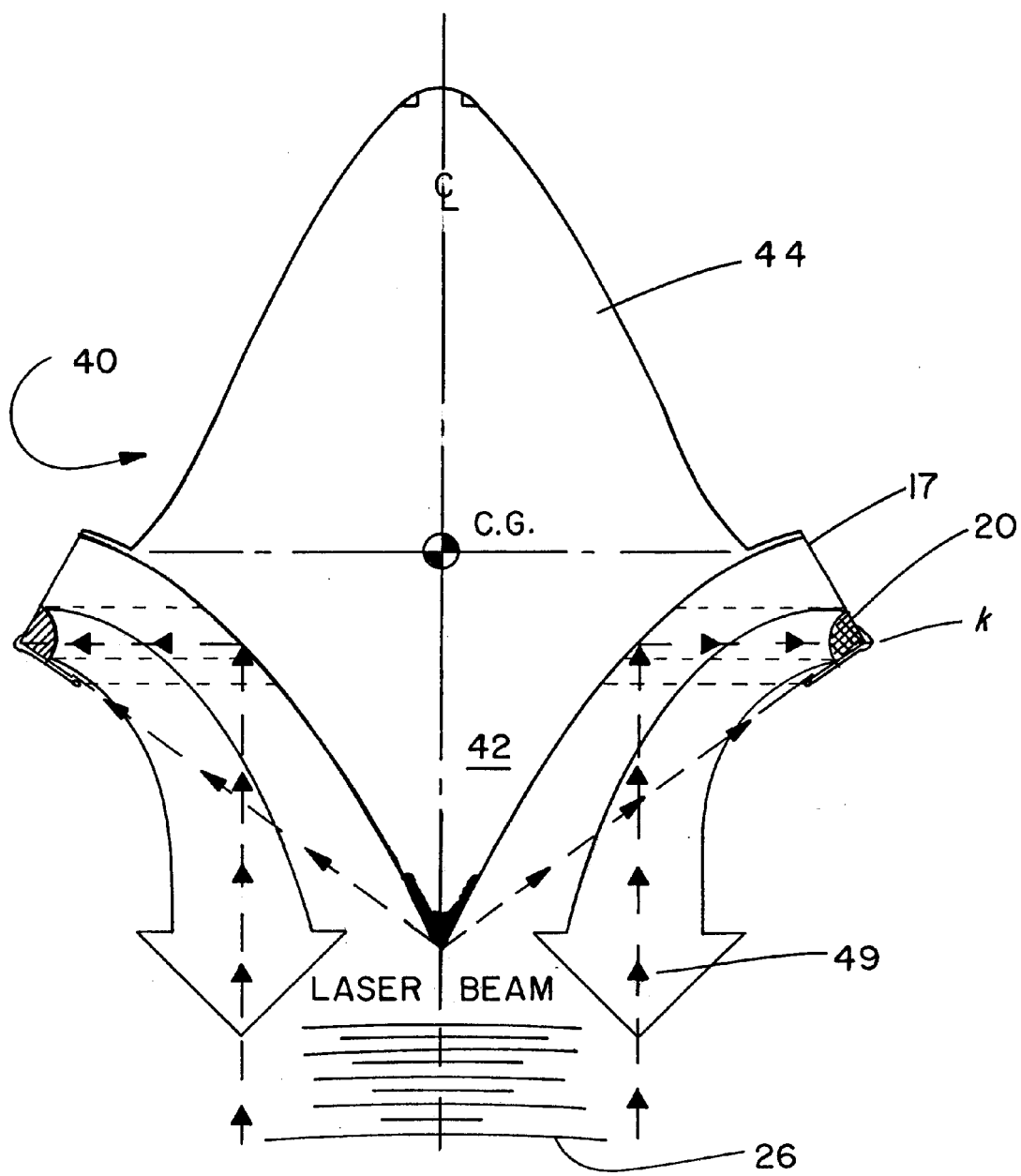
FIG. 7 is an enlarged elevation schematic view of the hybrid lasercraft of FIG. 5 in rocket propulsion in space.

At about 30 km altitude the lasercraft 44 rockets into space per FIG. 7 and the fuel ring 20 continues to ablate delivering thrust, per arrows 49, which flow smoothly aft and out the lasercraft nozzle, now free from the sensible atmosphere, e.g., per FIG. 6.

As shown in FIG. 5, the afterbody 42 of lasercraft 40 is preferably shaped as an off-axis parabola, while the trailing edge 46 of the shroud 17, angles toward the trailing portion 45 of the parabola 42 on either side (fore or aft) of the afterbody tip 43. That is, cooperating with the afterbody is the shroud (or cowl) 17, which directs the aft propulsion flow over the afterbody. Preferred is a shroud with a trailing edge angled toward the tip 43 of the afterbody 42, per FIG. 5. These two components cooperate to retain the lasercraft in its pulsed laser beam, such as beam 26 of FIG. 6.

Thus per FIG. 5, the leading wall 21 of the shroud 17 can be at an angle of 30±15° with the vertical, as shown in FIG. 5. Such wall 21 would pivot at crook k, which is preferably located at focus 'p' of the parabola of FIG. 5.

Figure 8:
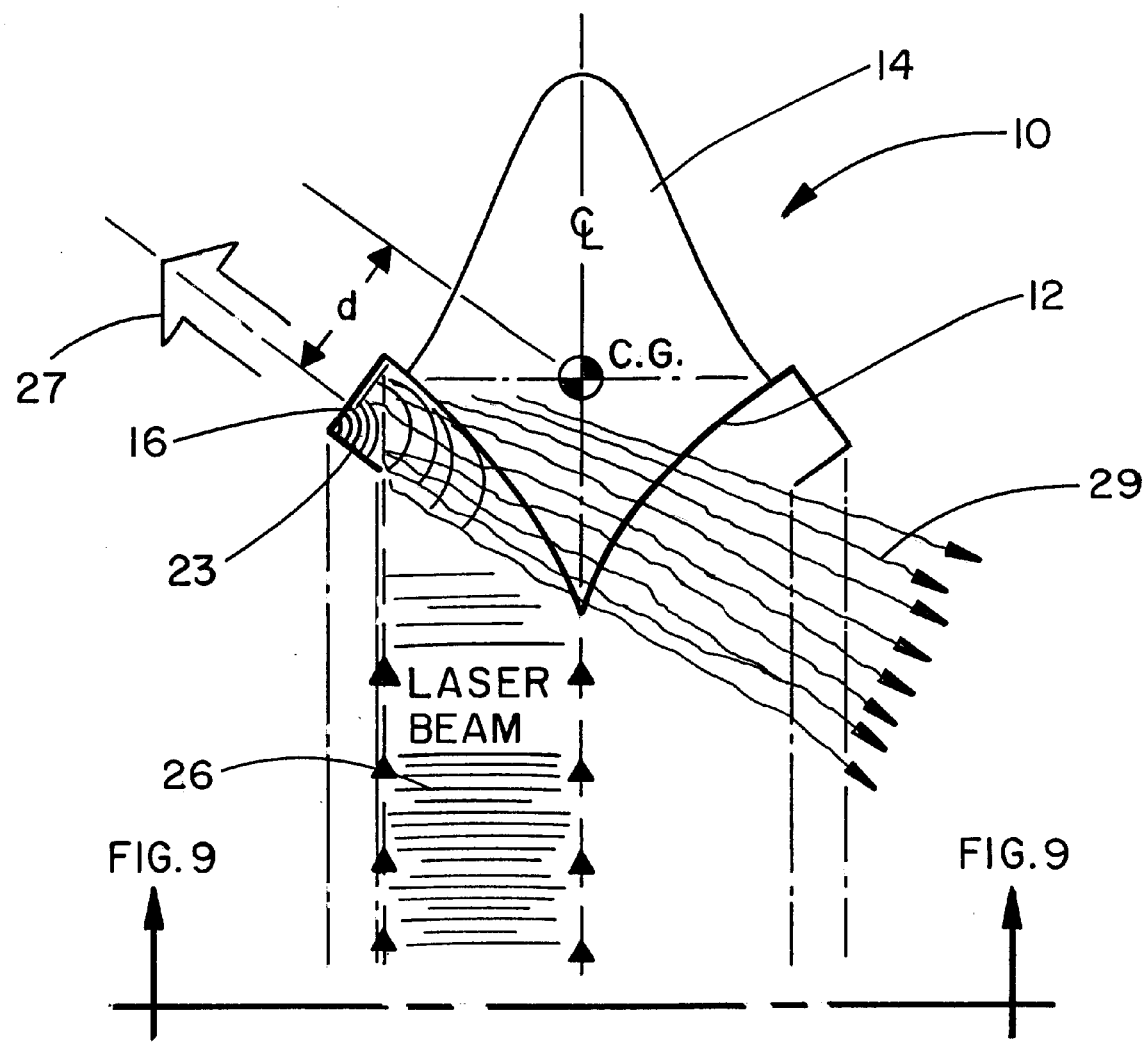
FIG. 8 is an elevation schematic view of a lasercraft embodying the invention in a self centering operation.
Figure 9:
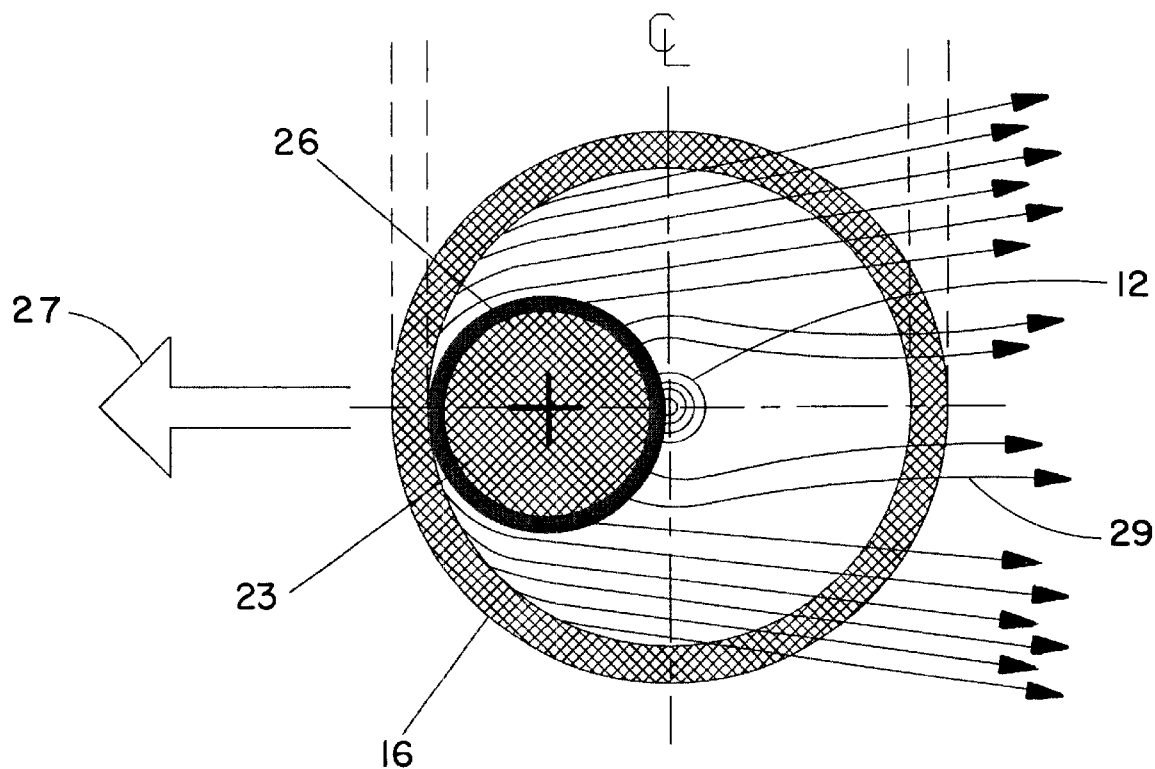
FIG. 9 is a cross section elevation view of the lasercraft of FIG. 8, taken on lines 9—9, looking in the direction of the arrows

Self-centering of the lasercraft embodiments of the invention, can take place as shown in FIGS. 8 and 9 hereof. That is, when the lasercraft 10 (also shown in FIGS. 1 & 4) goes off center of the laser beam 26, per FIGS. 8 and 9, the blast wave diverts the exhaust 29 to the right, causing the lasercraft 10 to move to the left, per thrust vector 27, bringing the lasercraft back to or near the center of its laser beam 26, as indicated in FIGS. 1 and 3 hereof.

Figure 3:
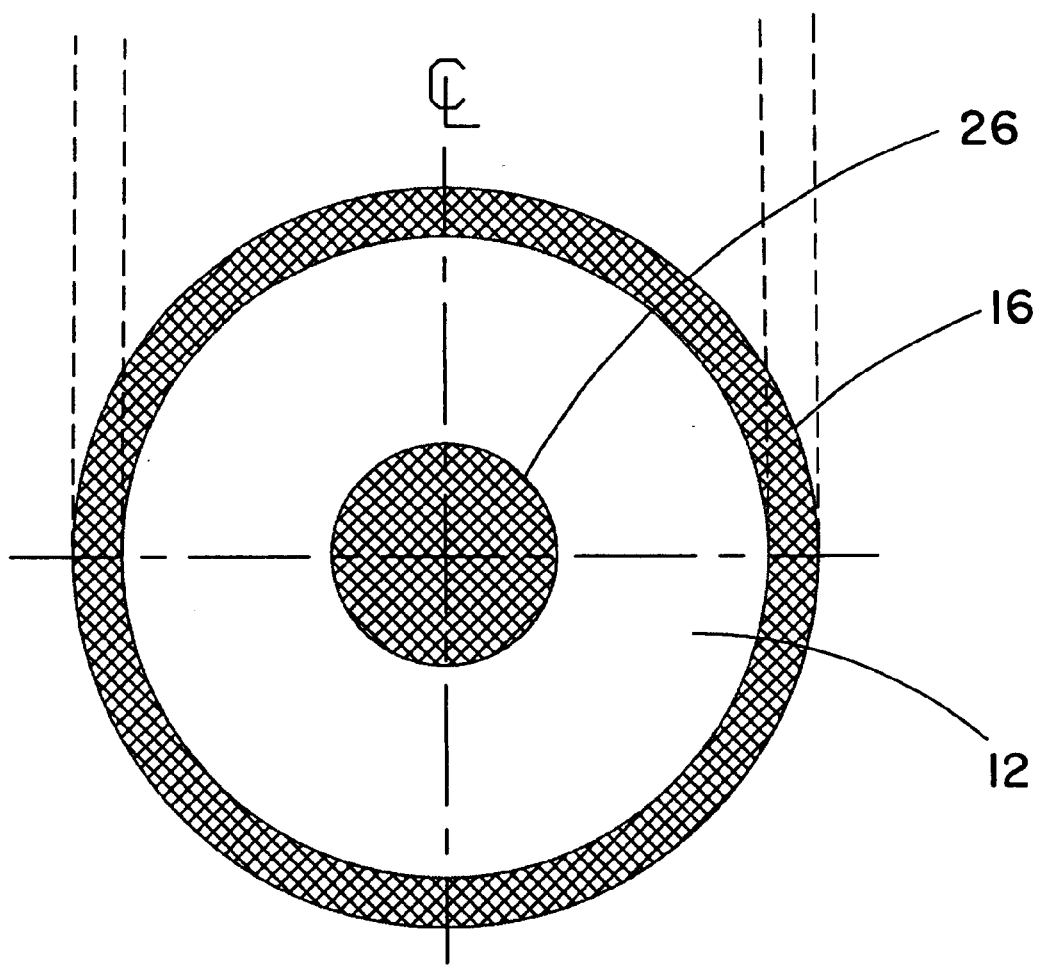
FIG. 3 is a cross-sectional view of the lasercraft of FIG. 1, taken on lines 3—3, looking in the direction of the arrows.

Note relative to FIGS. 1, 2, and 3 that though the laser beam may start off in a square angular profile per FIG. 2, as it projects upwardly, it tends to merge into a rounded cross sectional shape, per beam 26 of FIG. 3. Also the lasercraft of the invention, whether the air-breathing embodiment of FIG. 1 or the hybrid or rocket embodiments of FIGS. 5 and 7, will tend to self center on the square (or near field) beam of FIG. 2 as well as on the merged (or far field) beam of FIGS. 3 and 9, due to the self-centering effect of the cooperating afterbody and shroud trailing edge discussed above and illustrated in FIGS. 8 and 9.

Further the cross section of the laser beam impinging on the afterbody, desirably is smaller than the largest cross section of such afterbody and preferably is about one half the area of such afterbody cross section, as indicated in FIGS. 8 and 9 so as not to partly spill or miss the useful portion of its parabolic target.

The propelling laser beam of the invention can be solid or annular in cross section to self center the lasercraft of the invention and can be angular, curved or a combination thereof in such cross section.

In sum, the hybrid lasercraft of the invention includes the three components described above. That is, the forebody aeroshell or nose 44 acts as an external compression surface and the afterbody 42 and shroud 17 combine to form the rocket thrust nozzle. Also, the complementary shapes of shroud and afterbody, as discussed above and below, co-operate to assist beam retention or self centering of the lasercraft on the laser beam, to guide the propulsion of the lasercraft during launch and afterward.

The afterbody optic of the lasercraft of the invention is desirably shaped as a parabola as discussed below.

That is, the general formula for a parabola is $$y^2=4px,$$

where x is the axis of the parabola, y is the radial distance of a point (x, y) from the x axis and p is the focal point of such parabola, as shown in FIG. 5 hereof.

Now for the case where $$f=p/2R=p/D,$$

$$y^2=4fDx,$$

where D is the diameter of the base of the parabola, again as shown in FIG. 5 hereof.

Per the present invention, the shape of the afterbody is as defined in the above last equation and a preferred shape of the afterbody is such parabola where f=0.05 to 0.2 including where f=0.128±25% or 0.09 to 0.16.

Also the afterbody, combined with the shroud, functions as a plug nozzle (or Aerospike™) surface during expansion of the hot gas or plasma out of the shroud for propulsion. That is, the shroud interior acts as a absorption chamber (for the laser beam energy) and primary thrusting surface shaped to enhance thrust, by directing the plasma exhaust over such afterbody surface.

As indicated above, the lasercraft shroud is greatly heated by the pulsed laser beam (after it is reflected off the parabolic optic into the crook of the shroud) to temperatures in a range of 300 to 600° C., including up to 3,000° C. This means that the shroud of the lasercraft must be of highly durable material such as C/C, C/ SiC and SiC/SiC.

The forebody and the afterbody are also made of durable metal, e.g., aircraft aluminum or of durable ceramic matrix composite (CMC) materials, e.g., SiC, or C/SiC as noted above.

In the rocket mode of the invention, the lasercraft can have a fuel insert in the shroud, of an acetal resin, e.g., "Delrin" (a TM of Dupont Co.), formaldehyde polymers, PMMA, polyimide, polytetrafluoroethylene, "Teflon"(a TM of Dupont Co.) and polymers containing H, C and O, as desired and which fuel insert can weigh, e.g., from ¼ to ½ or more of the weight of the lasercraft.

The fuel insert is preferably a "Delrin" ring, mounted in the crook of the lasercraft shroud, because the IR laser energy is desirably absorbed not only on the surface but in depth in the fuel ring, which is then heated in depth for more efficient ablation and thrust out the lasercraft nozzle. Fuel rings other than of Delrin can be employed to power the lasercraft of the invention, e.g., fuel rings of cellulose acetate, celluloid and cellulose nitrate (e.g., Pyroxylin™).

Further the lasercraft of the invention is spin stabilized at, e.g., 1,000 to 10,000 rpm or more with a suitable rate being 3,000–5,000 rpm. Spin stabilizing of the lasercraft of the invention can also assist it's self-centering on the propelling laser beam per the invention.

Spin stabilizing of the lasercraft of the invention in the air-breathing mode and the rocket mode, greatly helps the propulsion of such craft on the laser beam. That is, in the air-breathing mode, rotation promotes uniform heating of the shroud in flight as well as reducing negative effects of defects or of the reflectivity of the optic or even of structural or balance defects of such craft. In the rocket mode, such rotation promotes uniform ablation of the solid propellant ring spinning in the shroud and also promotes containment of the softening propellant in the shroud by centrifugal force.

Various high power lasers can be employed per the invention provided there is sufficient pulse power to heat the air in the shroud of the lasercraft to a high-pressure plasma. Such pulsed laser can be of CO, I, oxygen-iodine, excimer and preferably is of $CO_2$, which presently outputs, e.g., 10–30 Hz with a 5–30 microsecond pulse width. Other lasers are available for use per the invention, which can output 50 to 1,000 J pulses, at 10–1,000 Hz.

The lasercraft of the invention can weigh 20–1000 g, while 20–200 g is suitable for smaller payloads. For launch of a 1 kg lasercraft in to space, a 1 megawatt laser might well be required. As for size of the lasercraft, a shroud diameter of 10 cm to 140 cm or more is suitable.

The present invention thus provides 1) an axisymetric, parabolic mirror, 2) a forebody aeroshell, 3) an annular shroud, 4) lightweight metal components, 5) gyroscopically stabilized on the annular laser beam to provide, 6) a laser propelled vehicle in one mode and a rocket propelled vehicle in a second mode which can lead to, 7) a single-stage-to-space craft.

The invention further provides an inexpensive method for launching small sensor satellites into space. The present invention (upon scale-up in laser power and lasercraft size) has the potential to place sensor microsatellites, weighing up to 100 kg, into low earth orbit at a cost of 100 to 1,000 times less than existing space transportation systems. The inventive lasercraft is also of interest because of its, e.g., 1 meter diameter telescope optical capabilities, once in orbit.

Also per the invention, small commercial payloads can be launched into, e.g., low earth orbit, by industry, universities and private groups. An astronomy club or ham radio club can have their own telescope or relay satellite in space. Such satellites can be used for astronomy, communications, earth resource monitoring, space science measurements and other applications.

Again the lasercraft of the invention is suitably employed in its air-breathing and rocket propulsion modes or embodiments as noted above. Thus when the laser launched craft ascends to such sufficient altitude that the air breathing propulsion mode weakens, the on-board rocket fuel can be ablated to further propel such lasercraft upward to orbit, e.g., low earth orbit. Once in orbit, the lasercraft of the invention can become, e.g., an autonomous sensor microsatellite capable of delivering precise, high quality information typical of today's large orbital platforms.

What is claimed is:

1. A laser propelled craft comprising:
   a) a forebody or nose,
   b) a tapering parabolic afterbody optic, wherein the parabolic afterbody shape is defined by $y^2=4fDx$, where x is the axis of the parabola, y is the radial distance of a point (x,y) from the x axis, p is the focal point of such parabola, D is the diameter of the base of the parabola and f=p/D,
   c) an annular shroud mounted therebetween and extending aft to define an annular space around a portion of said afterbody and
   d) means to transmit a pulsed laser beam toward said craft and said afterbody optic and thence into said annular shroud to heat and pressurize the air in said annular space to an expanding plasma to propel said craft, said afterbody and shroud being so shaped as to remain in said laser beam as said craft is propelled thereby.

2. The lasercraft of claim 1 wherein said afterbody tapers towards its trailing end to define an end portion and said shroud has a trailing edge angled toward said end portion to define a beam retaining or self centering nozzle therebetween.

3. The lasercraft of claim 1 wherein f is in the range of 1 to 2.

4. The lasercraft of claim 1 wherein said afterbody and shroud define a plug nozzle.

5. The lasercraft of claim 1 wherein said afterbody and shroud have reflective surfaces.

6. The lasercraft of claim 1 being spin stabilized.

7. The lasercraft of claim 6 being spin stabilized at 1,000–5,000 rpm.

8. The lasercraft of claim 1 wherein the laser beam is annular or solid in cross-section.

9. The lasercraft of claim 8 wherein said cross-section defines an annular rectangle.

10. A laser propelled craft comprising:
   a) a forebody or nose,
   b) a tapering parabolic afterbody optic and
   c) an annular shroud mounted therebetween and extending aft to define an annular space around a portion of said afterbody, wherein said shroud carries a solid fuel insert mounted in its crook and
   d) means to transmit a pulsed laser beam toward said craft and said afterbody optic and thence to said annular shroud to heat and pressurize the air in said annular space to an expanding plasma to propel said craft, said afterbody and shroud being so shaped as to remain in said laser beam as said craft is propelled thereby.

11. The lasercraft of claim 10 wherein said fuel insert is annular and surrounds a portion of said afterbody projecting therethrough.

12. The lasercraft of claim 10 wherein said fuel insert includes acetal resin, formaldehyde polymer, PMMA, polyimide, polytetrafluoroethylene, hydrocarbon polymer containing oxygen or a combination thereof.

13. The lasercraft of claim 11 wherein said fuel insert is ablated by said laser beam to deliver thrust between shroud and afterbody in a rocket propulsion mode.

14. The lasercraft of claim 1 where said optic and said shroud define a plug nozzle and said shroud enhances thrust by directing heated, high pressure air plasma over the surface of said optic.

15. The lasercraft of claim 6 wherein said shroud carries a solid fuel insert mounted therein so that the rotation thereof permits uniform ablation of solid propellant in flight on said pulsed laser beam.

16. The lasercraft of claim 15 wherein said rotation promotes containment of the propellant in the shroud by centrifugal force.

17. The lasercraft of claim 6 wherein the resulting rotation promotes uniform heating of the shroud in flight on the laser beam.

* * * * *